(12) United States Patent
Lee et al.

(10) Patent No.: US 12,173,103 B2
(45) Date of Patent: Dec. 24, 2024

(54) SCALABLE PREPARATION OF JANUS PARTICLES WITH HIGH NATURALITY

(71) Applicant: The Trustees of the University of Pennsylvania, Philadelphia, PA (US)

(72) Inventors: Daeyeon Lee, Wynnewood, PA (US); Kathleen J Stebe, Penn Valley, PA (US); Yang Lan, London (GB)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 17/212,282

(22) Filed: Mar. 25, 2021

(65) Prior Publication Data

US 2021/0301054 A1   Sep. 30, 2021

Related U.S. Application Data

(60) Provisional application No. 62/994,449, filed on Mar. 25, 2020.

(51) Int. Cl.
| | | |
|---|---|---|
| *C08F 251/02* | (2006.01) | |
| *B01F 23/41* | (2022.01) | |
| *C08F 2/22* | (2006.01) | |
| *C08F 2/48* | (2006.01) | |
| *C08F 120/32* | (2006.01) | |

(52) U.S. Cl.
CPC ........ *C08F 251/02* (2013.01); *B01F 23/4105* (2022.01); *C08F 2/22* (2013.01); *C08F 2/48* (2013.01); *C08F 120/32* (2013.01); *B01F 23/4145* (2022.01); *B01F 23/4146* (2022.01)

(58) Field of Classification Search
None
See application file for complete search history.

(56) References Cited

U.S. PATENT DOCUMENTS

| | | |
|---|---|---|
| 7,709,544 B2 | 5/2010 | Doyle et al. |
| 9,623,046 B2 | 4/2017 | Percec et al. |
| 9,910,352 B2 | 3/2018 | Doyle et al. |
| 10,493,037 B2 | 12/2019 | Tuteja et al. |
| 2016/0332131 A1 | 11/2016 | Lee et al. |
| 2017/0119911 A1 | 5/2017 | Lee et al. |
| 2017/0129978 A1 | 5/2017 | Lee et al. |
| 2018/0127577 A1 | 5/2018 | Haase et al. |
| 2018/0236450 A1 | 8/2018 | Issadore et al. |

(Continued)

FOREIGN PATENT DOCUMENTS

| | | |
|---|---|---|
| WO | 2009/061372 A1 | 5/2009 |
| WO | 2018/067469 A1 | 4/2018 |
| WO | 2018/125523 A1 | 7/2018 |

OTHER PUBLICATIONS

Aveyard, R. Can Janus Particles Give Thermodynamically Stable Pickering Emulsions? Soft Matter 2012, 8, 5233-5240.

(Continued)

*Primary Examiner* — Jeffrey D Washville
(74) *Attorney, Agent, or Firm* — BakerHostetler

(57) ABSTRACT

Provided are Janus particles derived from natural starting materials, including starting materials that are plant-based and are not based on petrochemicals. Also provided are related compositions that include the disclosed particles, including emulsion compositions. Additionally provided are methods of synthesizing the disclosed Janus particles.

17 Claims, 8 Drawing Sheets
(8 of 8 Drawing Sheet(s) Filed in Color)

(56) References Cited

U.S. PATENT DOCUMENTS

| | | | |
|---|---|---|---|
| 2018/0297000 A1 | 10/2018 | Lee et al. | |
| 2018/0353433 A1* | 12/2018 | Tuteja | A61K 9/5073 |
| 2020/0109055 A1* | 4/2020 | Czaplewski-Campbell | |
| | | | A01N 31/16 |
| 2020/0291236 A1* | 9/2020 | Mechrez | C09C 1/3081 |

OTHER PUBLICATIONS

Bradley, L. C.; Chen, W.-H.; Stebe, K. J.; Lee, D. Janus and Patchy Colloids at Fluid Interfaces. Curr. Opin. Colloid Interface Sci. 2017, 30, 25-33.

Calvo-Flores, F. G.; Monteagudo-Arrebola, M. J.; Dobado, J. A.; Isac-Garcia, J. Green and Bio-Based Solvents. Top. Curr. Chem. 2018, 376, 18.

Chen, D.; Amstad, E.; Zhao, C.-X.; Cai, L.; Fan, J.; Chen, Q.; Hai, M.; Koehler, S.; Zhang, H.; Liang, F.; Yang, Z.; Weitz, D. A. Biocompatible Amphiphilic Hydrogel-Solid Dimer Particles as Colloidal Surfactants. ACS Nano 2017, 11, 11978-11985.

Du, J.; O'Reilly, R. K. Anisotropic Particles with Patchy, Multicompartment and Janus Architectures: Preparation and Application. Chem. Soc. Rev. 2011, 40, 2402-2416.

Fan, J.-B.; Liu, H.; Song, Y.; Luo, Z.; Lu, Z.; Wang, S. Janus Particles Synthesis by Emulsion Interfacial Polymerization: Polystyrene as Seed or Beyond? Macromolecules 2018, 51, 1591-1597.

Fan, J.- B.; Song, Y.; Liu, H.; Lu, Z.; Zhang, F.; Liu, H.; Meng, J.; Gu, L.; Wang, S.; Jiang, L. A General Strategy to Synthesize Chemically and Topologically Anisotropic Janus Particles. Sci. Adv. 2017, 3, No. e1603203.

Gericke, M.; Trygg, J.; Fardim, P. Functional Cellulose Beads: Preparation, Characterization, and Applications. Chem. Rev. 2013, 113, 4812-4836.

Gu, H.; Yang, Z.; Gao, J.; Chang, C. K.; Xu, B. Heterodimers of Nanoparticles: Formation at a Liquid-Liquid Interface and Particle-Specific Surface Modification by Functional Molecules. J. Am. Chem. Soc. 2005, 127, 34-35.

Haider, T. P.; Volker, C.; Kramm, J.; Landfester, K.; Wurm, F. R. Plastics of the Future? The Impact of Biodegradable Polymers on the Environment and on Society. Angew. Chem. Int. Ed. 2019, 58, 50-62.

Hillmyer, M. A. The Promise of Plastics from Plants. Science 2017, 358, 868-870.

Hong, L.; Jiang, S.; Granick, S. Simple Method to Produce Janus Colloidal Particles in Large Quantity. Langmuir 2006, 22, 9495-9499.

Hu, J.; Zhou, S.; Sun, Y.; Fang, X.; Wu, L. Fabrication, Properties and Applications of Janus Particles. Chem. Soc. Rev. 2012, 41, 4356-4378.

Iwata, T. Biodegradable and Bio-Based Polymers: Future Prospects of Eco-Friendly Plastics. Angew. Chem. Int. Ed. 2015, 54, 3210-3215.

Jiang, S.; Van Dyk, A.; Maurice, A.; Bohling, J.; Fasano, D.; Brownell, S. Design Colloidal Particle Morphology and Self-Assembly for Coating Applications. Chem. Soc. Rev. 2017, 46, 3792-3807.

Lan et al., "Scalable Synthesis of Janus Particles with High Naturality," ACS Sustainable Chem. Eng., vol. 8, Issue 48, 2020, pp. 17680-17686.

Lan, Y.; Choi, J.; Li, H.; Jia, Y.; Huang, R.; Stebe, K. J.; Lee, D. Janus Particles with Varying Configurations for Emulsion Stabilization. Ind. Eng. Chem. Res. 2019, 58, 20961-20968.

Lan, Y.; Jia, Y.; Lee, D. Chapter 10. Pickering Emulsions Stabilized by Polymer Colloids. Particle-Stabilized Emulsions and Colloids; The Royal Society of Chemistry, 2019; 323-348.

Liang, H.; Cacciuto, A.; Luijter, E.; Granick, S. Clusters of Charged Janus Spheres. Nano Lett. 2006, 6, 2510-2514.

Marquis, M.; Renard, D.; Cathala, B. Microfluidic Generation and Selective Degradation of Biopolymer-Based Janus Microbeads. Biomacromolecules 2012, 13, 1197.

Meier, M. A. R.; Metzger, J. O.; Schubert, U. S. Plant Oil Renewable Resources as Green Alternatives in Polymer Science. Chem. Soc. Rev. 2007, 36, 1788-1802.

Mirabedini, S. M.; Dutil, I.; Farnood, R. R. Preparation and Characterization of Ethyl Cellulose-Based Core-Shell Microcapsules Containing Plant Oils. Colloids Surf., A 2012, 394, 74-84.

Mohammadinejad, R.; Karimi, S.; Iravani, S.; Varma, R. S. Plant-Derived Nanostructures: Types and Applications. Green Chem. 2016, 18, 20-52.

Nakahama, K.; Kawaguchi, H.; Fujimoto, K. Novel Preparation of Nonsymmetrical Microspheres Using the Langmuir-Blodgett Technique. Langmuir 2000, 16, 7882-7886.

Park, B. J.; Brugarolas, T.; Lee, D. Janus Particles at an Oil-Water Interface. Soft Matter 2011, 7, 6413-6417.

Pi, C.; Yuan, J.; Liu, H.; Zuo, Y.; Feng, T.; Zhan, C.; Wu, J.; Ye, Y.; Zhao, L.; Wei, Y. In Vitro and in Vivo Evaluation of Curcumin Loaded Hollow Microspheres Prepared with Ethyl Cellulose and Citric Acid. Int. J. Biol. Macromol. 2018, 115, 1046-1054.

Poggi, E.; Gohy, J.-F. Janus Particles: From Synthesis to Application. Colloid Polym. Sci. 2017, 295, 2083-2108.

Raza, S.; Yong, X.; Yang, B.; Xu, R.; Deng, J. Biomass Trans-Anethole-Based Hollow Polymer Particles: Preparation and Application as Sustainable Absorbent. ACS Sustain. Chem. Eng. 2017, 5, 10011-10018.

Rochman, C. M. Microplastics Research from Sink to Source. Science 2018, 360, 28-29.

Sanchez, L.; Yi, Y.; Yu, Y. Effect of Partial PEGylation on Particle Uptake by Macrophages. Nanoscale 2017, 9, 288-297.

Sannino, A.; Demitri, C.; Madaghiele, M. Biodegradable Cellulose-Based Hydrogels: Design and Applications. Materials 2009, 2, 353-373.

Shogren, R. L.; Petrovic, Z.; Liu, Z.; Erhan, S. Z. Biodegradation Behavior of Some Vegetable Oil-Based Polymers. J. Polym. Environ. 2004, 12, 173-178.

Titirici, M.- M.; White, R. J.; Brun, N.; Budarin, V. L.; Su, D. S.; Del Monte, F.; Clark, J. H.; MacLachlan, M. J. Sustainable Carbon Materials. Chem. Soc. Rev. 2015, 44, 250-290.

Tu, F.; Lee, D. Shape-Changing and Amphiphilicity-Reversing Janus Particles with pH-Responsive Surfactant Properties. J. Am. Chem. Soc. 2014, 136, 9999-10006.

Tu, F.; Park, B. J.; Lee, D. Thermodynamically Stable Emulsions Using Janus Dumbbells as Colloid Surfactants. Langmuir 2013, 29, 12679-12687.

Walther, A.; Muller, A. H. E. Janus Particles: Synthesis, Self-Assembly, Physical Properties, and Applications. Chem. Rev. 2013, 113, 5194-5261.

Yadavali, S.; Jeong, H.-H.; Lee, D.; Issadore, D. Silicon and Glass Very Large Scale Microfluidic Droplet Integration for Terascale Generation of Polymer Microparticles. Nat. Commun. 2018, 9, 1222.

Yang, S.; Guo, F.; Kiraly, B.; Mao, X.; Lu, M.; Leong, K. W.; Huang, T. J. Microfluidic Synthesis of Multifunctional Janus Particles for Biomedical Applications. Lab Chip 2012, 12, 2097-2102.

Yi, Y.; Sanchez, L.; Gao, Y.; Yu, Y. Janus Particles for Biological Imaging and Sensing. Analyst 2016, 141, 3526-3539.

Yuan, Y.; Yong, X.; Zhang, H.; Deng, J. Biobased Microspheres Consisting of Poly(Trans-Anethole-Co-Maleic Anhydride) Prepared by Precipitation Polymerization and Adsorption Performance. ACS Sustain. Chem. Eng. 2016, 4, 1446-1453.

Zhou, Y.; Wang, D.; Huang, S.; Auernhammer, G.; He, Y.; Butt, H.-J.; Wu, S. Reversible Janus Particle Assembly via Responsive Host-Guest Interactions. Chem. Commun. 2015, 51, 2725-2727.

Zhu, Y.; Romain, C.; Williams, C. K. Sustainable Polymers from Renewable Resources. Nature 2016, 540, 354-362.

\* cited by examiner

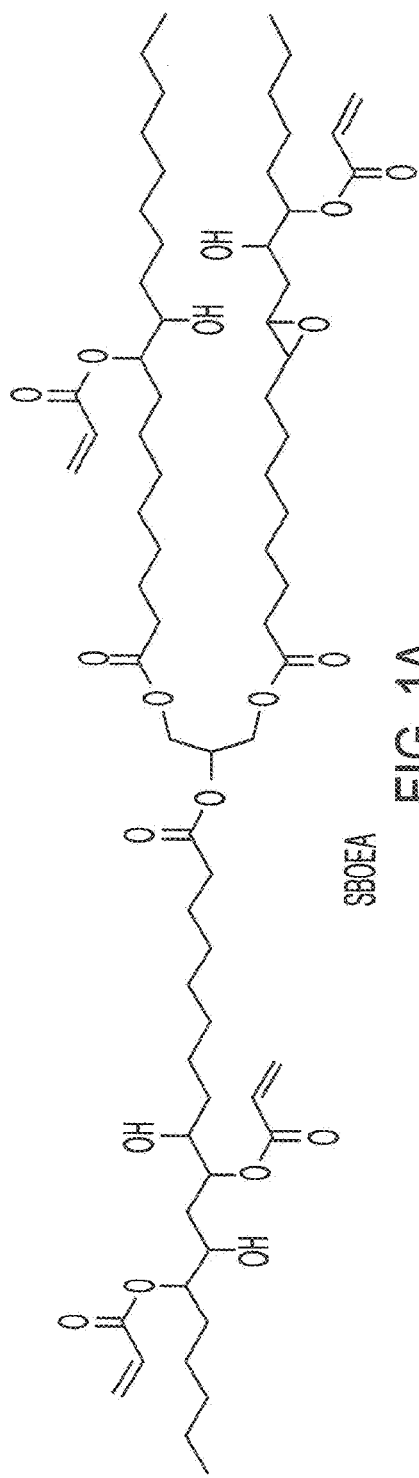
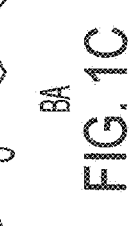
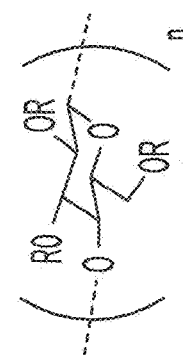
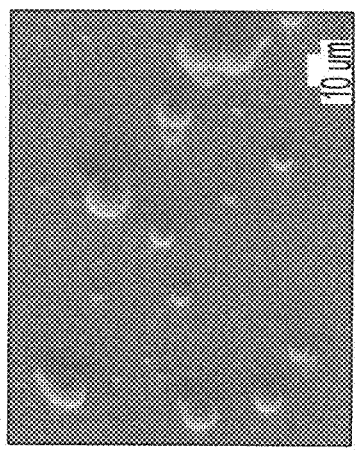
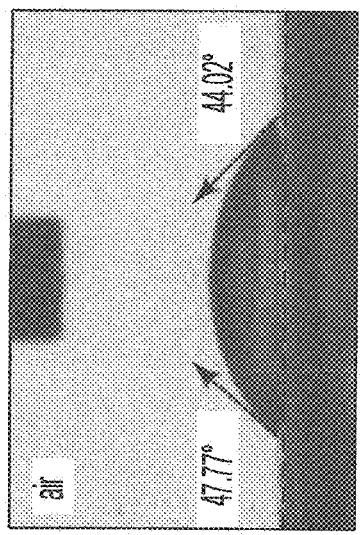
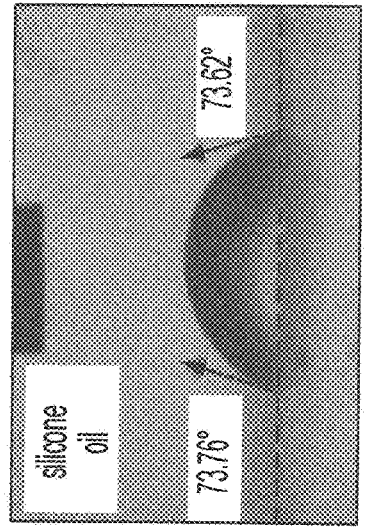
FIG. 1A
FIG. 1B
FIG. 1C
FIG. 1D
FIG. 1E
FIG. 1F

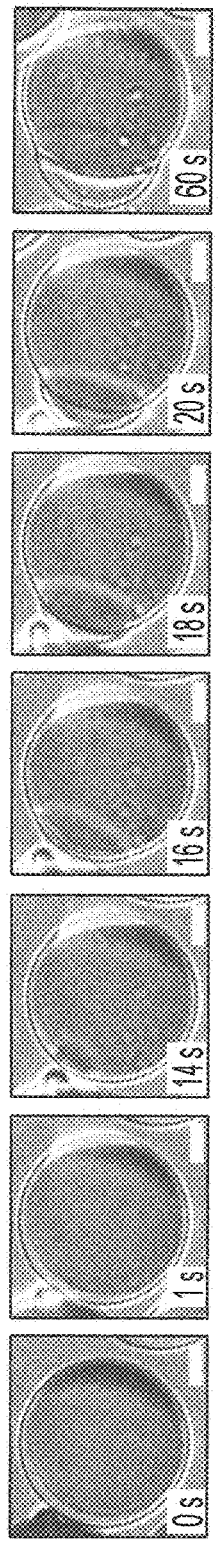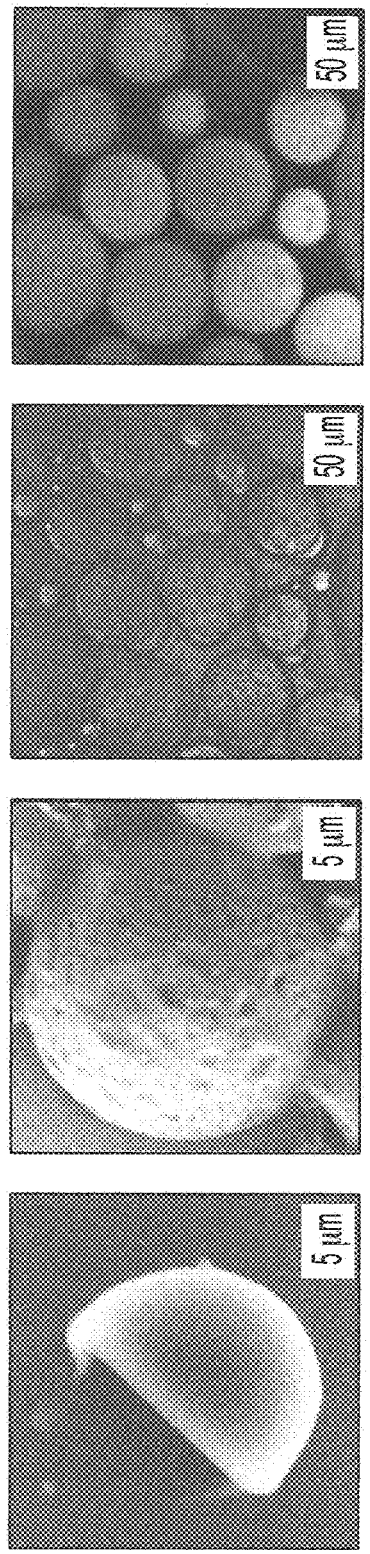
FIG. 3A
FIG. 3B  FIG. 3C  FIG. 3D  FIG. 3E

Large-scale Fabrication of Janus Particles

SCALABLE PREPARATION OF JANUS PARTICLES WITH HIGH NATURALITY

RELATED APPLICATIONS

The present application claims priority to and the benefit of U.S. patent application No. 62/994,449, "Scalable Preparation of Janus Particles With High Neutrality" (filed Mar. 25, 2020), the entirety of which application is incorporated herein by reference for any and all purposes.

TECHNICAL FIELD

The present disclosure relates to the field of Janus particles and to the field of forming polymeric bodies using naturally-derived starting materials.

BACKGROUND

Janus particles are colloidal particles with two distinct regions with opposite polarities or different surface chemistry. Analogous to molecular surfactants, one of the most intriguing applications of Janus particles is as solid surfactants to stabilize multiphasic mixtures, e.g., emulsions.

Janus particles can in some instances stabilize emulsions more effectively than molecular surfactants due to substantially large detachment energy required to remove them from the interface, even enabling formation of thermodynamically stable emulsions. Moreover, the potential to introduce multi-functional moieties onto the two compartments of Janus particles can imbue emulsions with magnetic, catalytic or electrical properties. These features make Janus particles useful in a wide range of applications including cosmetics, food, painting and drug delivery.

To date, a variety of techniques including seeded emulsion polymerisation, colloidal assembly, particle lithography techniques, glancing-angle deposition, nanosphere lithography, and microfluidic methods have been developed to prepare Janus particles. Most of the techniques, however, are designed for preparation of Janus particles using petrochemical-based precursor and materials.

A number of countries have enacted regulatory bans on plastic microbeads, which are polymeric colloidal particles made primarily from petrochemical-based polymers. These bans have been enacted due to the ecological damage and negative health effects of such microbeads. Thus, the need for particles made by bio-based and eco-friendly materials has become increasingly pressing.

Green materials, especially those derived from plant and wood, are ideal candidates of bio-based and eco-friendly materials to prepare microparticles for practical applications. Accordingly, there is a need in the art for Janus particles made from green starting materials.

SUMMARY

In meeting the described needs, the present disclosure first provides a Janus particle, the Janus particle comprising (a) a hydrophilic region derived from one or more natural or naturally-derived hydrophilic species; and (b) a hydrophobic region derived from one or more natural or naturally-derived hydrophobic species.

Also provided is a population of Janus particles according to the present disclosure, wherein the population is essentially monodisperse.

Further disclosed is a population of Janus particles according to the present disclosure, wherein the population is polydisperse.

Additionally provided is an emulsion, the emulsion comprising a first species, a second species immiscible with the first species, and a plurality of Janus particles according to the present disclosure, wherein the plurality of Janus particles are disposed (e.g., at an interface between the first species and the second species) so as to emulsify the first species and the second species.

Also disclosed is a method, comprising contacting a plurality of Janus particles according to the present disclosure to a first species and a second species immiscible with the first species under such conditions that the plurality of Janus particles become disposed at an interface between the first species and the second species so as to emulsify the first species and the second species.

Further provided is a method, comprising: contacting (a) at least one of a natural or naturally-derived hydrophilic species with (b) a natural or naturally-derived hydrophobic species; and polymerizing, solidifying, or gelating at least one of the (c) natural or naturally-derived hydrophobic species or (d) the natural or naturally-derived hydrophobic species; the polymerizing, solidifying, or gelating being performed so as to give rise to a Janus particle that comprises (e) a region derived from the natural hydrophilic species and (f) a region derived from the natural hydrophobic species.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 1A-1F: (FIG. 1A) Chemical structures of soybean oil epoxidized acrylate (SBOEA), ethyl cellulose (EC) and butyl acetate (BA). Water contact angle of EC film in silicone oil (FIG. 1B) and in air (FIG. 1C). (FIG. 1D-1E), Scanning electron microscope (SEM) image of Janus particles synthesized by batch-mode emulsion polymerization. FIG. 1F shows the scanning electron microscope (SEM) image of SBOP/EC Janus particles where dumbbell-shaped Janus particles can be clearly observed.

(FIG. 2A) Formation of oil microdroplets of EC, SBOEA, HMP and BA in a flow-focusing microfluidic device. Optical microscope images of (FIG. 2B) an oil microdroplet of EC, SBOEA, HMP and BA, (FIG. 2C) Janus particle with cross-linked SBOP and EC/BA compartments. (FIG. 2D), SEM image of the SBOP/EC Janus particle.

FIGS. 3A-3E: (FIG. 3A) oil microdroplet of SBOEA, HMP and BA upon UV irradiation. (FIG. 3B) SEM image of the oil microdroplet of SBOEA, HMP and BA after polymerization. (FIG. 3C) SEM image of oil microdroplet of EC, HMP and BA after UV irradiation. Optical microscope image (FIG. 3D) and the corresponding laser scanning confocal microscopy (FIG. 3E), LSCM image, green channel: FTIC) of oil microdroplet of EC, SBOEA, HMP and BA after UV irradiation.

DETAILED DESCRIPTION OF ILLUSTRATIVE EMBODIMENTS

Figure 2A:
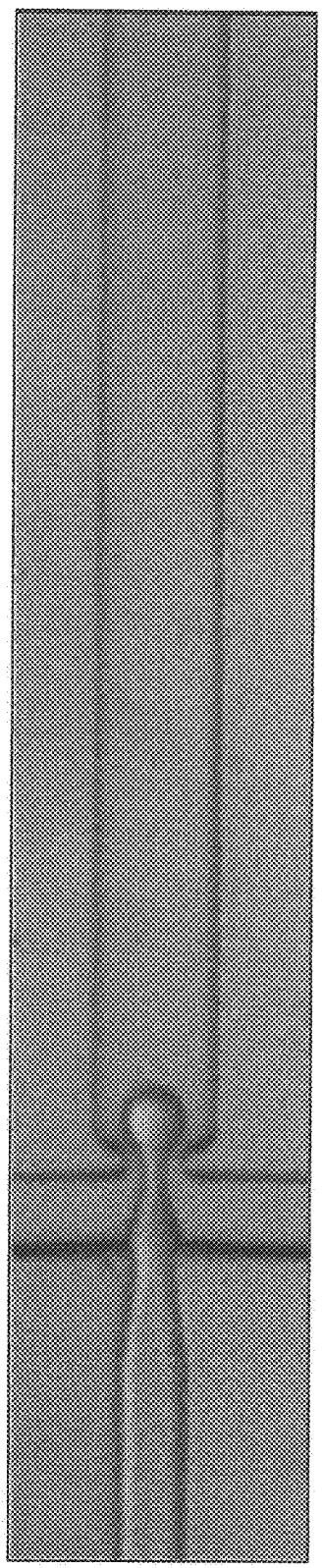
FIGS. 2A-2D.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Exemplary Results

The following results are illustrative only and accordingly do not limit the scope of the present disclosure or the appended claims. Additional material may be found in Lan et al., "Scalable Synthesis of Janus Particles with High Naturality," ACS Sustainable Chem. Eng. 2020, 8, 48, 17680-17686, the entirety of which document is incorporated herein by reference for any and all purposes.

Presented is an exemplary synthesis of Janus particles with high naturality, using a single emulsion polymerization method. Soybean oil epoxidized acrylate (SBOEA) monomers were polymerized within a single emulsion droplet of butyl acetate (BA) and ethyl cellulose (EC), resulting in dumbbell-shaped Janus particles with two compartments made by soybean oil polymers (SBOP) and EC, separately. Although SBOEA, BA, and EC were used in this example synthesis, it should be understood that other materials (i.e., other monomers, other solvents) can be used with the disclosed technology.

Exemplary oils that can be used to form monomers (e.g., epoxidized acrylate monomers) include soybean, rapeseed, canola, sunflower, safflower, peanut, cottonseed, coconut, palm, and rice bran oils, as but some examples. Suitable celluloses include alkyl celluloses (e.g., methylcellulose, ethyl cellulose, ethyl methyl cellulose), as well as hydroxyalkyl celluloses (e.g., hydroxyethyl cellulose, hydroxylpropyl cellulose, hydroxyethyl methyl cellulose, hydroxypropyl methyl cellulose, ethyl hydroxyethyl cellulose, and carboxyalkyl cellulose.

The solvent (BA) which is found in many types of fruits as well as the two primary components of these Janus particles are derived from non-petrochemical sources. The formation of the SBOP/EC Janus particle benefits from the anchoring effect of SBOP particle at the interface of the emulsion droplet during the polymerization of SBOEA. Moreover, generation of monodisperse SBOP/EC Janus particle at large scale is shown by using a glass-silicon microfluidic device, showing applications in industrial emulsification.

Synthesis of Janus Particles with High Naturality

Among many types of green materials that can be used for particle synthesis, plant oils and cellulose offer advantages because of low price and diverse functionalities; both plant oil and cellulose are widely available at large scales; also, diverse chemical reactions can be performed on plant oils and cellulose to yield intermediates for different products.

In one example embodiment, a soybean oil derivative, commercially available soybean oil epoxidized acrylate (SBOEA, FIG. 1A), was used to build the hydrophobic region of Janus particles. The acrylate groups of SBOEA enable the formation of crosslinked soybean oil polymer (SBOP). Meanwhile, commercially available ethyl cellulose (EC, FIG. 1B), a linear polysaccharide derived from cellulose by replacement of the hydroxyl groups on cellulose with ethyl groups (48% substitution), was used to form the hydrophilic part of Janus particles. Although 48% of the hydrophilic hydroxyl groups were substituted by the hydrophobic ethyl groups, the surface of EC remained hydrophilic as shown by the water contact angle of the EC films in silicone oil (FIG. 1D) and in air (FIG. 1E). To facilitate the chemical process, butyl acetate (BA, FIG. 1C), which can be found in many types of fruits and widely used as fruit flavoring in foods, is employed as the solvent of viscous SBOEA and EC powder.

The SBOP/EC Janus particles were then prepared simply by inducing polymerisation in a single emulsion, within which a mixture of EC, SBOEA, BA and initiator azobisisobutyronitrile (AIBN) serves as the dispersion phase and water with 1 wt % PVA as the continuous phase. FIG. 1F shows the scanning electron microscope (SEM) image of SBOP/EC Janus particles where dumbbell-shaped Janus particles can be clearly observed. Because the emulsion was prepared by shaking the dispersion phase into the continuous phase, the Janus particles prepared in this way were polydisperse particles, ranging in size from about 0.05 μm to about 100 μm in diameter. The sizes as well as the size distribution of Janus particles prepared by this efficient single emulsion polymerization method can be further tuned by changing the reaction conditions such as stirring speed and surfactant types, leading to scalable synthesis for industrial applications. Accordingly, it should be understood that the present disclosure provides both polydisperse Janus particles as well as monodisperse Janus particles.

Monodisperse SBOP/EC Janus Particles

To prepare monodisperse SBOP/EC Janus particles with controllable sizes, one can use a flow-focusing microfluidic device to generate the single emulsion droplets of EC, SBOEA, BA and initiators. Photo-initiator 2-hydroxy-2-methylpropiophenone (HMP) was employed to replace AIBN here to facilitate the observation of subsequent polymerization under optical microscope. The microfluidic device was fabricated from poly(dimethylsiloxane), with two inlets and one outlet, as shown in FIG. 2A.

The oil flow of EC, SBOEA, HMP and BA is segmented into monodisperse oil microdroplets at the intersection by a perpendicular aqueous continuous flow. By changing the flow rate of the oil and aqueous flows, monodisperse oil microdroplets of EC, SBOEA, HMP and BA are easily obtained.

Figure 2D:
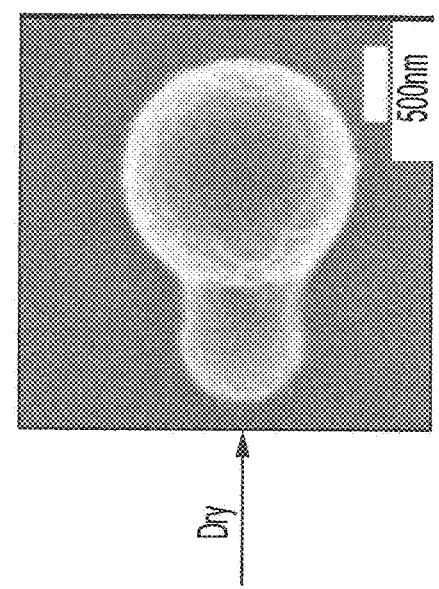
Figure 2C:
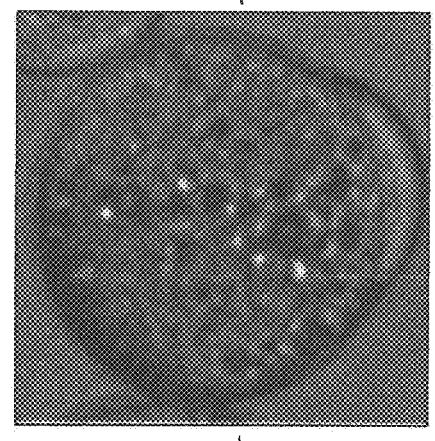
Figure 2B:
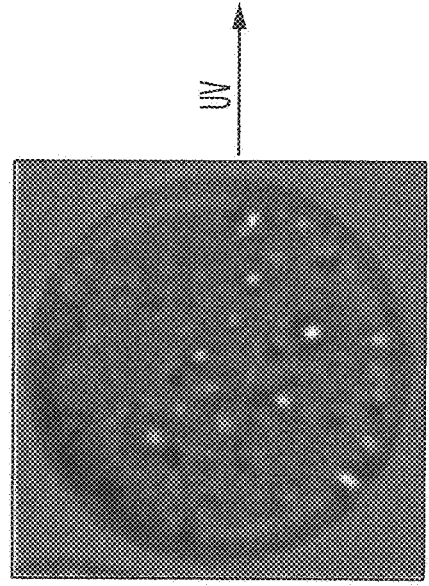

FIG. 2B shows a typical optical microscope image of an oil microdroplet (EC: SBOEA: HMP: BA) where isotropic spherical liquid droplet with small dots can be observed. Without being bound to any particular theory, the small dots in the oil microdroplet are precipitates of EC polymers due to their decreased solubility when water diffuses into the oil microdroplet from the continuous phase.

Subsequently, the polymerisation of SBOEA in the oil microdroplet was initiated by irradiation of UV light for 1 minute. FIG. 2C shows the optical microscope image of an oil microdroplet after the polymerization. Anisotropic dumbbell-shaped Janus particles can be clearly observed. The smaller compartment of the Janus particles, which is formed during the UV irradiation, is (without being bound to any particular theory) inferred to be the cross-linked SBOP. Meanwhile, the majority of EC remained in the microdroplet together with BA after the polymerization as evidenced by the small dots in the larger bulb of the Janus particle. Finally, the SBOP/EC Janus particles with a smooth smaller bulb and a rough larger bulb are obtained after the evaporation of BA (FIG. 2D).

Formation Mechanism of SBOP/EC Janus Particles

To understand the formation mechanism of the single emulsion polymerization method for SBOP/EC Janus particles, two experiments were carried out in the absence of either EC or SBOEA from the oil microdroplets during the polymerization.

FIG. 3A shows the optical images of the evolvement of oil microdroplet of SBOEA, HMP and BA (without EC) upon UV irradiation. In this case, all the oil microdroplet is clear and transparent (FIG. 3A, 0s). No small dots of precipitated EC can be observed.

The UV light was irradiated from the right side of the image indicated by the bright spot on the right side of the oil microdroplet (FIG. 3A, 1s). The polymerization of SBOEA was observed after irradiation of UV light for 14 s as indicated by the newly formed dark spot on the left top of the oil droplet (FIG. 3A, 14s). Interestingly, the polymerization of SBOEA started at the oil side of the liquid-liquid interface and locates at opposite end of the UV light source. Benefiting from the SBOP seed at the interface, further polymerization of SBOEA is anchored at only one spot as indicated by the growing size of the sole dark spot in the oil microdroplet (FIG. 3A, 16s). As the dark spot of SBOP keeps growing during the polymerization, phase separation of the SBOP from the oil microdroplet is observed, leading to the formation of anisotropic Janus structure (FIG. 3A, 18s-60s). After evaporation of the BA, the SBOP formed at the liquid-liquid interface shows a bowl-like structure as observed by SEM (FIG. 3B).

When SBOEA is omitted from the preparation of SBOP/EC Janus particles, no specific morphology change of the oil microdroplet of EC, HMP and BA was observed upon UV irradiation. After the evaporation of BA, only spherical particles with rough surfaces were obtained, as shown in FIG. 3C. An optical microscope image (FIG. 3D) and the corresponding laser scanning confocal microscopy (FIG. 3E), LSCM image, green channel: FTIC) of oil microdroplet of EC, SBOEA, HMP and BA after UV irradiation are also provided.

A possible mechanism for the formation of SBOP/EC Janus particles is now, discussed based on the results obtained above. Single emulsion droplets of EC, SBOEA, BA and initiators are formed by either shaking or segmentation (FIG. 2A). Part of the EC in the emulsion droplets would precipitate out when water is diffused into the droplets. Upon initiation, the polymerization of SBOEA forms a single cross-linked SBOP particle at the interface of each droplet. Consequently, the polymerization of the remaining SBOEA monomers is anisotropically carried out in the droplet due to the anchoring effect of the SBOP particle at the interface. With the growth of the SBOP particle at the interface, it leads to the formation of a protrusion from the droplet because of the high Flory-Huggins interaction parameter between the cross-linked SBOP and the solvent BA. The protrusion is mainly composed by SBOP and most of the EC polymers remains in the BA droplet as proved by the fact that no dextran polymers labelled with FITC dye can be found in the SBOP section after polymerization. Finally, the SBOP/EC Janus particles are obtained after the evaporation of the solvent BA.

Figure 4:
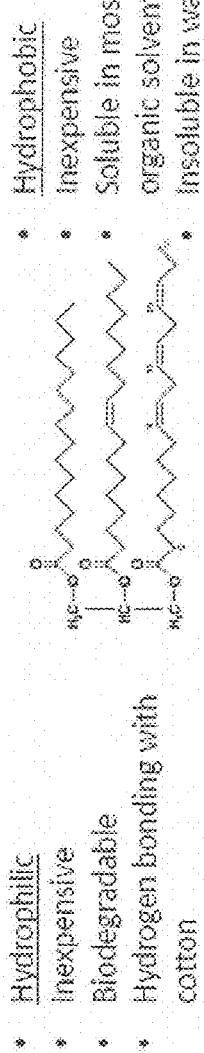
FIG. 4 provides an overview of exemplary natural materials that can be used to form Janus particles according to the present disclosure.
Figure 4:
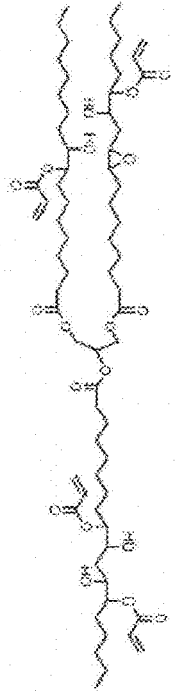
Figure 4:
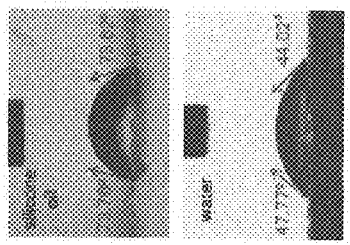
Figure 4:
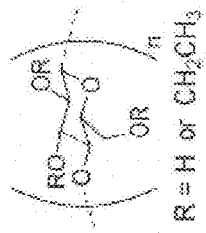

Additional disclosure is provided in FIGS. 4-8. FIG. 4 provides an overview of exemplary natural materials that can be used to form Janus particles according to the present disclosure. One exemplary, non-limiting such material is ethyl cellulose, which material occurs naturally and need not be formed from a petrochemical feed. Exemplary (but also non-limiting) hydrophobic materials include, e.g., triglycerides (vegetable oils), glycerides, chitosan, and the like. Such materials can be polymerizable in their natural form (e.g., if they include an unsaturated C=C bond) but can also be modified to include a moiety that allows for polymerization. One non-limiting example of such a material is soybean oil epoxy acrylate (SBOEA). Other epoxies (with or without acrylates) can also be used.

Figure 5:
FIG. 5 provides an illustration of an exemplary single emulsion polymerization to form Janus particles according to the present disclosure.

FIG. 5 provides an illustration of an exemplary single emulsion polymerization to form Janus particles according to the present disclosure. In this example, SBOEA, EC, and an initiator (in this instance, Igracure 1173™) are combined in a solvent, butyl acetate. It should be understood that every participating species in the synthesis (including initiators and solvents) can be natural or naturally-derived, free of derivation from petrochemicals. As shown, the foregoing participants can be mixed in water (with an amount of PVA present), shaken and irradiated to polymerize the SBOEA. Excess solvent can be removed via drying, leaving behind hydrophobic/hydrophilic Janus particles. The foregoing synthesis can be used to give rise to a polydisperse population of Janus particles.

Figure 6:
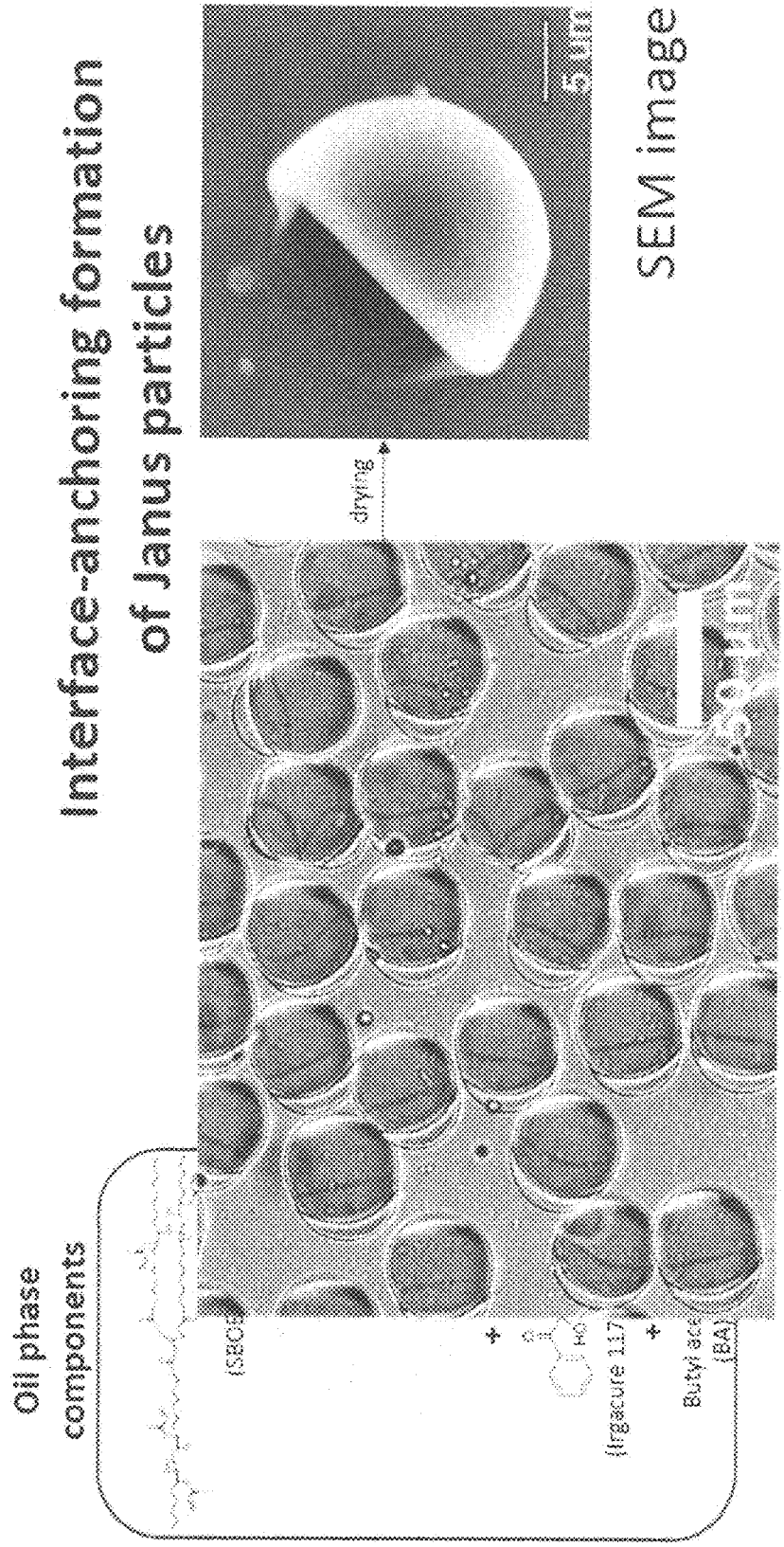
FIG. 6 provides an exemplary, non-limiting particle formation mechanism.

FIG. 6 provides an exemplary, non-limiting particle formation mechanism. As shown, Janus particles formed according to the present disclosure can exhibit a cap-shaped region of polymerized hydrophobic species (in this case, SBOEA) contacting a hydrophilic region (in this case, EC) of the particle.

As described elsewhere herein, one can modulate the relative sizes of the hydrophilic and hydrophobic regions by adjusting the relative amounts of hydrophobic species and hydrophilic species in the synthesis process, as well as by selecting different such species. For example, one may wish to have a Janus particle that has a comparatively large hydrophobic region, and one can select the hydrophobic and hydrophilic species accordingly. As an example, if one wants to stabilize oil-in-water emulsion, one can make the hydrophilic part relatively larger than the hydrophobic region. If one wishes to stabilize water-in-oil emulsion, then one would can make the hydrophobic part relatively larger.

Figure 7:
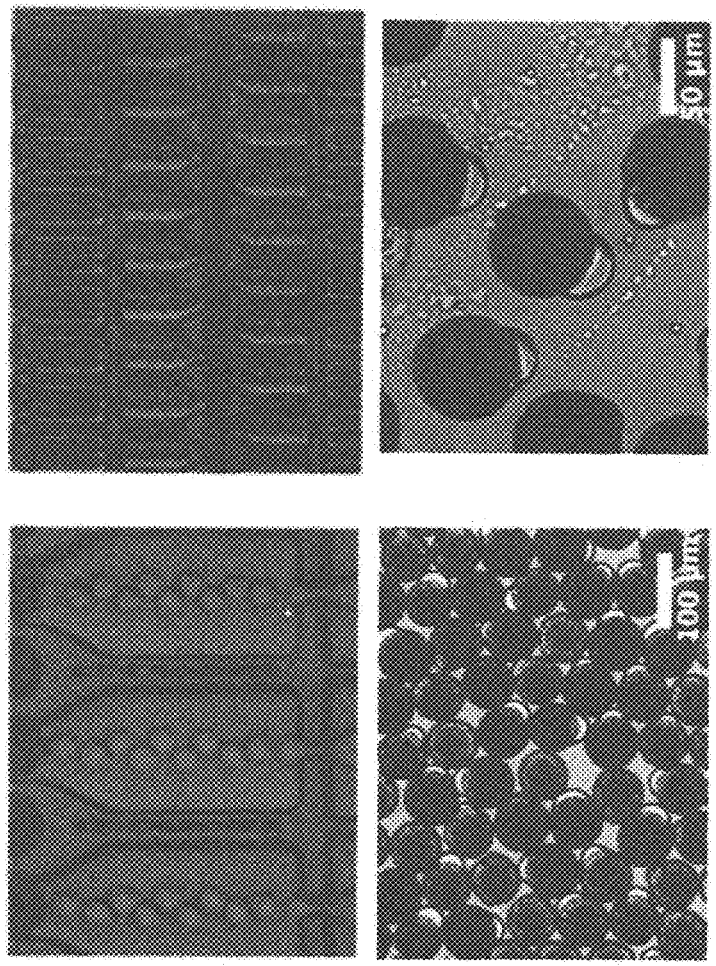
FIG. 7 provides an example, large-scale fabrication process for Janus particles according to the present disclosure.
Figure 7:
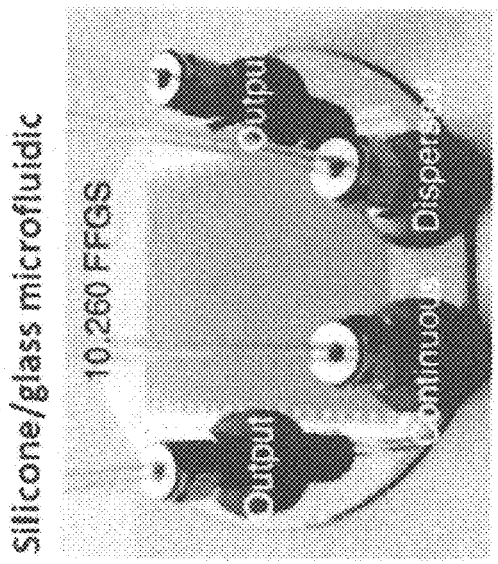

FIG. 7 provides an example, large-scale fabrication process for Janus particles according to the present disclosure. As shown, one can utilize the microfluidic techniques and systems described in Nature Comms., 2018, 9 (1), 1222. Additional information and techniques can be found in United States published patent applications US2018/0236450, US2018/0297000, US2017/0119911, US2016/0332131, US2018/0127577, and US2017/0129978, each of which foregoing applications is incorporated herein by reference in its entirety. As shown in FIG. 7, one can fabricate the disclosed Janus particles at large scale, and can also do so to produce monodisperse populations of such particles.

Figure 8:
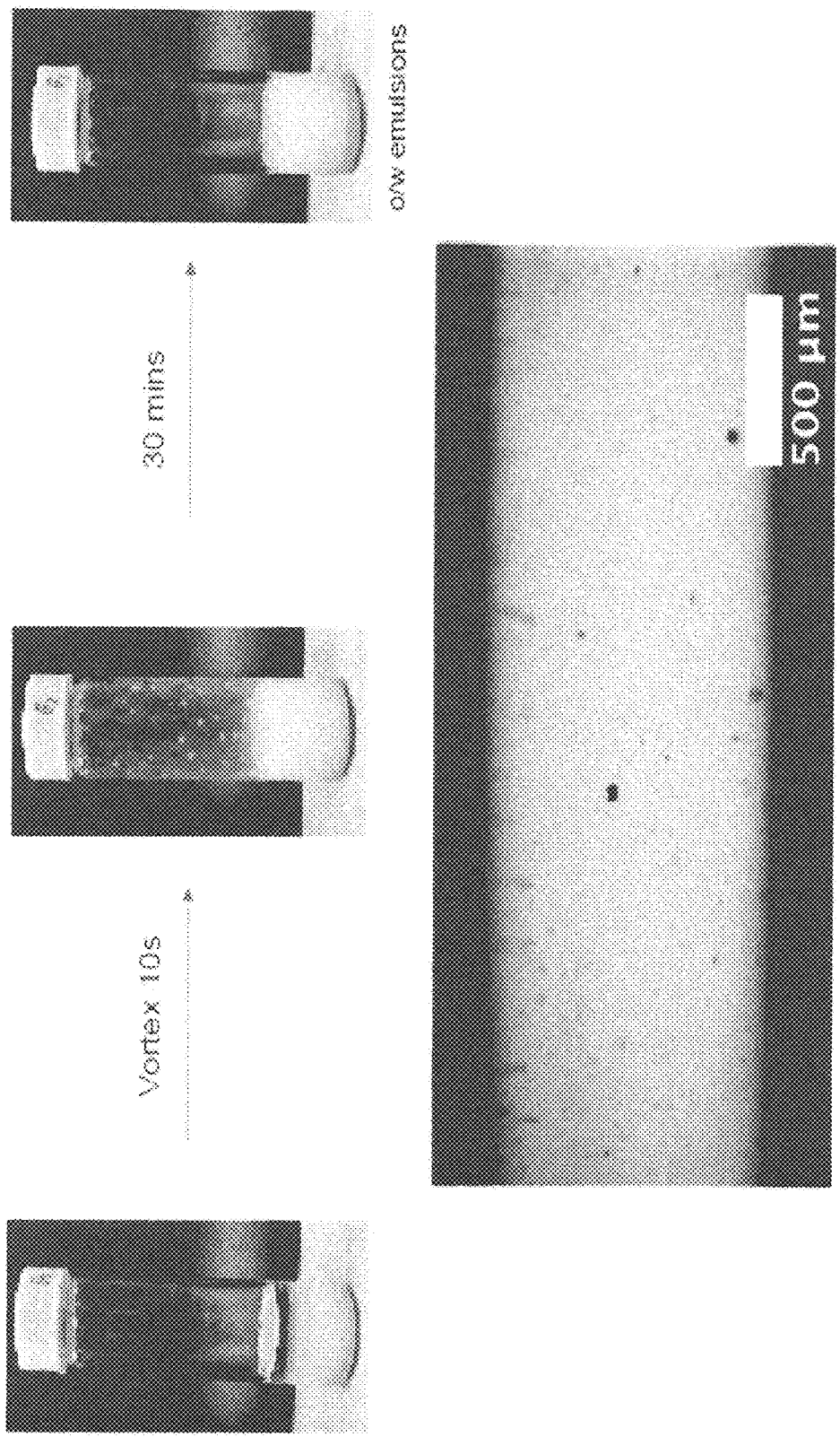
FIG. 8 provides an exemplary stabilized emulsion according to the present disclosure.

FIG. 8 provides an exemplary stabilized emulsion according to the present disclosure. As shown, after Janus particles according to the present disclosure were mixed with silicone oil and water and then vortexed, the resulting oil-in-water emulsion remained stable for 30 minutes, and also remained stable under a flow condition (bottom panel of FIG. 8).

Without being bound to any particular theories or embodiments, the disclosed technology presents a number of advantages over existing approaches. First, the disclosed technology can be used in place of traditional surfactant molecules (also known as molecular surfactants). Such traditional molecules are often derived from petrochemicals and can also be difficult or even impossible to separate from a mixture. In contrast, the disclosed technology provides particles that can be synthesized without the use of petrochemical starting materials. The disclosed particles can also be separated from mixtures by, e.g., filtration, magnetic fields, and the like, thus allowing one to recover the disclosed particles. This stands in contrast to traditional surfactants, which are not so easily recovered. In addition (and again without being bound to any particular theory), the naturally-derived particles disclose herein can be degraded more easily (in some embodiments) than petrochemical-derived materials, and the products of these degradations can be disposed of (or otherwise processed) with less environmental impact than would be seen with the degradation products of petrochemical-derived materials.

EMBODIMENTS

The following embodiments are illustrative only and do not limit the scope of the present disclosure or the appended claims.

Embodiment 1. A Janus particle, the Janus particle comprising (a) a hydrophilic region derived from one or more natural or naturally-derived hydrophilic species; and (b) a hydrophobic region derived from one or more natural or naturally-derived hydrophobic species.

The term "natural" refers to being derived from a plant or from a living organism (e.g., an insect, an animal), as opposed to being derived from petrochemicals. As one non-limiting example, cellulose extracted from plant matter is considered a natural hydrophilic species. The term "naturally derived" refers to a natural material that is further modified (e.g., to include one or more chemical groups that do not occur in the material's original form). The terms "natural" and "naturally derived" can also be understood as referring to species that are not obtained from petrochemicals.

Regarding the terms "hydrophilic" and "hydrophobic," if the water contact angle on the material in question is smaller than 90°, the material is considered hydrophilic. If the water contact angle is larger than 90°, the material is considered hydrophobic.

The hydrophilic region can be, e.g., a polymerized, solidified, or gelated region. As an example, the hydrophilic region can include cellulose, which is a natural polymer.

Embodiment 2. The Janus particle of Embodiment 1, wherein the natural or naturally-derived hydrophilic species comprises a polysaccharide. Exemplary polysaccharides include, e.g., starches, glycogen, inulin, arabinoxylans, cellulose, chitin, and pectins.

Embodiment 3. The Janus particle of Embodiment 1, wherein the natural or naturally-derived hydrophilic species comprises one or more of a cellulose, an alginate, a dextran, a chitosan and a peptide. Cellulose is considered especially suitable.

Embodiment 4. The Janus particle of Embodiment 3, wherein the cellulose comprises methyl cellulose, ethyl cellulose, or acetylated cellulose.

Embodiment 5. The Janus particle of Embodiment 3, wherein the dextran comprises acetylated dextran.

Embodiment 6. The Janus particle of Embodiment 1, wherein the natural or naturally-derived hydrophobic species comprises a glyceride.

Embodiment 7. The Janus particle of Embodiment 1, wherein the natural or naturally-derived hydrophobic species comprises a triglyceride.

Embodiment 8. The Janus particle of Embodiment 7, wherein the triglyceride comprises a vegetable oil or a fruit oil. Soybean oil, corn oil, jojoba oil, canola oil, and the like are all considered suitable, along with other oils mentioned herein.

Embodiment 9. The Janus particle of Embodiment 1, wherein the natural or naturally-derived hydrophobic species comprises a resin or a wax.

Embodiment 10. The Janus particle of Embodiment 1, wherein the natural or naturally-derived hydrophobic species comprises at least one unsaturated carbon-carbon bond. A natural hydrophobic species can also be modified to comprise at least one unsaturated carbon-carbon bond, an epoxy, or other group that can participate in polymerization, solidification, and/or gelation.

Embodiment 11. The Janus particle of any one of Embodiments 1-10, wherein the hydrophobic region is characterized as being cup-shaped in configuration. The hydrophobic region of a Janus particle (e.g., according to any one of Embodiments 1-10) can also be lens-shaped in configuration, e.g., similar to a contact lens or a shallow bowl in shape. Such a lens-shaped region can be concave or convex in configuration.

Embodiment 12. The Janus particle of any one of Embodiments 1-11, wherein the hydrophilic region is characterized as being spherical in configuration. The hydrophilic region can be ovoid, oblong, or otherwise shaped.

It should be understood that either one of the hydrophilic region or the hydrophobic region can define from 0.001 to 99.999% of the total surface area of the Janus particle. For example, the hydrophilic region can define from 0.001 to 99.999% of the surface area of the Janus particle (with the balance being the hydrophobic region), from about 0.01 to 99.99%, from 0.1 to 99.9%, from 1 to 99%, from 3 to 97%, from 5 to 95%, from 7 to 93%, from 10 to 90%, from 13 to 87%, from 15 to 85%, from 18 to 82%, from 21 to 79%, from 24 to 76%, from 29 to 71%, from 30 to 70%, from 33 to 67%, from 37 to 63%, from 40 to 60%, or even from 45 to 55% of the surface area of the Janus particle.

Embodiment 13. The Janus particle of any one of Embodiments 1-12, wherein the Janus particle defines a surface area, and wherein the hydrophobic region defines less than about 99% of the surface area, e.g., less than about 99, 95, 90, 85, 80, 75, 70, 65, 60, 55, 50, 45, 40, 35, 30, 25, 20, 10, or even less than about 5% of the surface area.

Embodiment 14. The Janus particle of Embodiment 13, wherein the hydrophobic region defines less than about 25% of the surface area.

Embodiment 15. A population of Janus particles according to any one of Embodiments 1-14, wherein the population is essentially monodisperse.

Embodiment 16. A population of Janus particles according to any one of Embodiments 1-14, wherein the population is polydisperse.

Embodiment 17. An emulsion, the emulsion comprising: a first species; a second species immiscible with the first species; and a plurality of Janus particles according to any one of Embodiments 1-14, wherein the plurality of Janus particles are disposed (e.g., at an interface between the first species and the second species) so as to emulsify the first species and the second species. Without being bound to any particular theory or embodiment, the Janus particles can act as replacements for surfactants or even act together with surfactants (i.e., in a composition that includes both surfactants and Janus particles). The present disclosure should be understood as also providing methods in which surfactants are at least partially replaced with Janus particles according to the present disclosure.

The first species can be, e.g., an aqueous species, and the second species can be, e.g., an oil or other species that is immiscible with the first species.

Such an emulsion can be, e.g., a cosmetic preparation (such as a lotion or a cream), an edible preparation, an industrial preparation (e.g., a processing aid) and the like.

Embodiment 18. The emulsion of Embodiment 17, wherein the emulsion is defined as an emulsion of the first species in the second species.

Embodiment 19. The emulsion of Embodiment 17, wherein the emulsion is defined as an emulsion of the second species in the first species.

Embodiment 20. A method, comprising contacting a plurality of Janus particles according to any one of Embodiments 1-14 to a first species and a second species immiscible with the first species under such conditions that the plurality of Janus particles become disposed at an interface between the first species and the second species so as to emulsify the first species and the second species.

Embodiment 21. A method, comprising: contacting (a) at least one of a natural or naturally-derived hydrophilic species with (b) a natural or naturally-derived hydrophobic species; and polymerizing, solidifying, or gelating at least one of the (c) natural or naturally-derived hydrophobic species or (d) the natural or naturally-derived hydrophobic species; the polymerizing, solidifying, or gelating being performed so as to give rise to a Janus particle that comprises (e) a region derived from the natural hydrophilic species and (f) a region derived from the natural hydrophobic species.

Embodiment 22. The method of Embodiment 21, wherein the polymerizing, solidifying, or gelating is performed in a natural medium or a naturally-derived medium. Such a medium can be, e.g., butyl acetate.

What is claimed:

1. A Janus particle, the Janus particle comprising (a) a single hydrophilic lobe derived from one or more natural or naturally-derived hydrophilic species; and (b) a single hydrophobic lobe derived from one or more natural or naturally-derived hydrophobic species, each of the single hydrophilic lobe and the single hydrophobic lobe having a rounded surface, and one of the single hydrophilic lobe and the single hydrophobic lobe cupped over the rounded surface of the other of the single hydrophilic lobe and the single hydrophobic lobe,
wherein the natural or naturally-derived hydrophilic species comprises a polysaccharide or a peptide, and
wherein the natural or naturally-derived hydrophobic species comprises a glyceride, a resin, or a wax.

2. The Janus particle of claim 1, wherein the natural or naturally-derived hydrophilic species comprises a polysaccharide.

3. The Janus particle of claim 2, wherein the polysaccharide comprises one or more of a cellulose, an alginate, a dextran, and a chitosan.

4. The Janus particle of claim 3, wherein the cellulose comprises methyl cellulose, ethyl cellulose, or acetylated cellulose.

5. The Janus particle of claim 1, wherein the natural or naturally-derived hydrophilic species comprises a peptide.

6. The Janus particle of claim 1, wherein the glyceride comprises a triglyceride.

7. The Janus particle of claim 1, wherein the natural or naturally-derived hydrophobic species comprises at least one unsaturated carbon-carbon bond.

8. The Janus particle of claim 1, wherein the single hydrophilic lobe is characterized as being spherical in configuration.

9. The Janus particle of claim 1, wherein the Janus particle defines a surface area, and wherein the hydrophobic lobe defines less than about 99% of the surface area.

10. The Janus particle of claim 9, wherein the hydrophobic lobe defines less than about 25% of the surface area.

11. A population of Janus particles according to claim 1, wherein the population is essentially monodisperse.

12. A population of Janus particles according to claim 1, wherein the population is polydisperse.

13. An emulsion, the emulsion comprising a first species, a second species immiscible with the first species, and a plurality of Janus particles according to claim 1, wherein the plurality of Janus particles are disposed so as to emulsify the first species and the second species.

14. The emulsion of claim 13, wherein the emulsion is defined as the first species in the second species.

15. The emulsion of claim 13, wherein the emulsion is defined as the second species in the first species.

16. A method, comprising contacting a plurality of Janus particles according to claim 1 to a first species and a second species immiscible with the first species under such conditions that the plurality of Janus particles become disposed at an interface between the first species and the second species so as to emulsify the first species and the second species.

17. A method, comprising:
contacting (a) at least one of a natural or naturally-derived hydrophilic species with (b) a natural or naturally-derived hydrophobic species; and polymerizing, solidifying, or gelating at least one of the (c) natural or naturally-derived hydrophobic species or (d) the natural or naturally-derived hydrophobic species; the polymerizing, solidifying, or gelating being performed so as to give rise to a Janus particle according to claim 1,
wherein the natural or naturally-derived hydrophilic species comprises a polysaccharide or a peptide, and
wherein the natural or naturally-derived hydrophobic species comprises a glyceride, a resin, or a wax.

* * * * *